C. VALLONE.
CONNECTING DEVICE FOR BEDSTEAD FRAME TUBES AND THE LIKE.
APPLICATION FILED JULY 22, 1912.
1,072,278.  Patented Sept. 2, 1913.
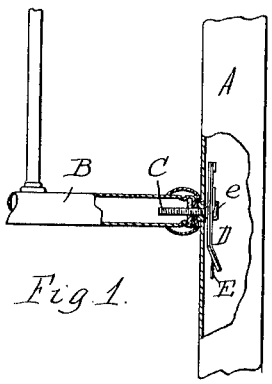
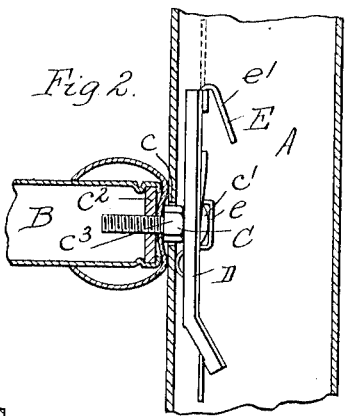
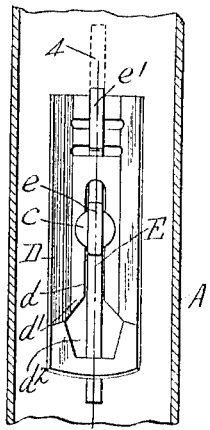
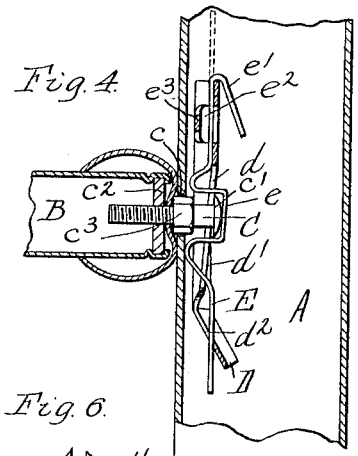
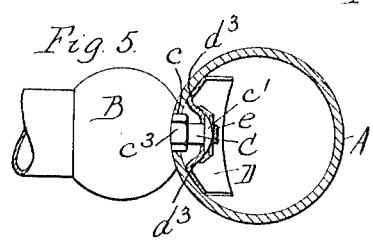
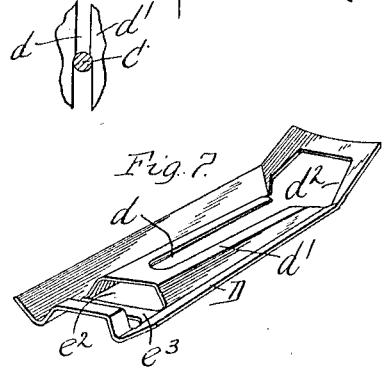
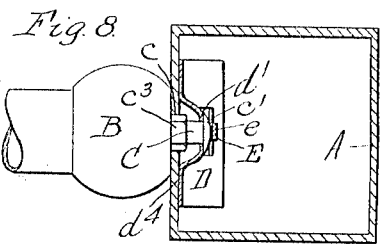
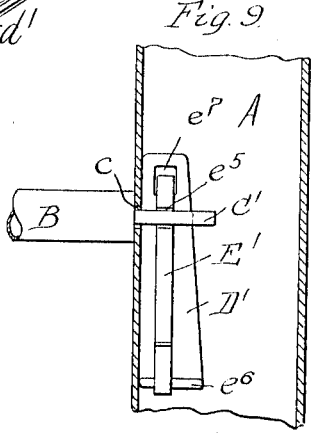
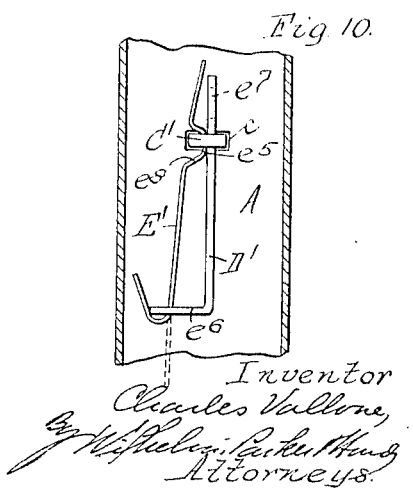
Witnesses:—
A. Borkenhagen
A. G. Dimond
Inventor
Charles Vallone,
by his Attorneys

UNITED STATES PATENT OFFICE.

CHARLES VALLONE, OF BUFFALO, NEW YORK, ASSIGNOR TO BARCALO MANUFACTURING COMPANY, OF BUFFALO, NEW YORK.

CONNECTING DEVICE FOR BEDSTEAD-FRAME TUBES AND THE LIKE.

1,072,278.     Specification of Letters Patent.      Patented Sept. 2, 1913.

Application filed July 22, 1912. Serial No. 711,004.

*To all whom it may concern:*

Be it known that I, CHARLES VALLONE, a citizen of the United States, residing at Buffalo, in the county of Erie and State of New York, have invented a new and useful Improvement in Connecting Devices for Bedstead-Frame Tubes and the Like, of which the following is a specification.

This invention relates to concealed connecting devices of the kind employed in tubular structures, such as metal bedstead frames, for fastening a tube or other member to the side of another tube between the ends thereof.

The objects of the invention are to produce a concealed connecting device of this sort which is of simple and inexpensive construction and which can be quickly and easily applied in tubular structures for connecting the parts, and will firmly and securely fasten the parts together and will not work loose; and also to provide a wedge connecting device with retaining means which positively lock the wedge in holding position and prevent the displacement thereof.

In the accompanying drawings: Figure 1 is a fragmentary elevation, partly in section, on a reduced scale, of a portion of a metal bedstead frame provided with a securing device embodying the invention. Fig. 2 is a sectional elevation thereof. Fig. 3 is a transverse sectional elevation thereof. Fig. 4 is a sectional elevation in line 4—4, Fig. 3. Fig. 5 is a sectional plan view thereof. Fig. 6 is a fragmentary sectional elevation showing the manner in which the slot of the wedge piece closes on the stud. Fig. 7 is a perspective view of the wedge piece detached. Fig. 8 is a sectional plan view showing a connecting device modified slightly for square tubes. Figs. 9 and 10 are sectional elevations in different planes showing a modified construction of the securing device.

Like reference characters refer to like parts in the several figures.

The connecting device is shown in the drawings as applied to tubular metal bedstead frames for securing a horizontal tube or member to the upright pillar or corner post of the end frame, but it is equally applicable to securing any other member or part to a tube or hollow post, and is not necessarily limited to use on bedsteads.

A represents one of the upright tubular pillars or corner posts of a bedstead end frame, and B one of the cross-bars, tubes or horizontal members which are secured at their ends to and connect the pillars. The usual ferrule or ornamental cap is secured over the end of the cross tube. All of these parts may be of any usual or suitable construction or shape.

C represents a stud which projects from the end of the cross tube B and is adapted to be inserted into the tube or pillar A through a hole $c$ in one side thereof, and D represents a wedge in the tube or pillar A between a head or portion $c'$ at the inner end of the stud C and that side of the tube in which the hole $c$ is located for securing the stud in the tube or pillar A. By driving the wedge block in between the head of the stud C and the wall of the tube or pillar, the stud is drawn inwardly, thereby drawing the end of the cross-tube B firmly against the outside of the tube or pillar and securing the parts together. A wedge coöperating with a headed stud in this way is disclosed in Patent No. 950,311, granted February 22, 1910, to myself and F. R. Rogers, assignors, but the wedge is operated by a screw which is carried by the wedge and engages the stud for forcing the wedge into place, whereas according to the present invention the wedge is adapted to be driven into place by striking it with a suitable tool inserted into the tube and is held by a retaining device of novel construction.

The stud may be of any desired shape and may be secured to the end of the cross-tube B in any suitable manner, and the wedge and its retaining device may be of different constructions, as hereinafter explained.

In the construction shown in Figs. 1–8, the stud C has a threaded stem which is screwed into a fixed plug or disk $c^2$ in the end of the cross-tube and is furnished with a lock nut $c^3$. This nut substantially fills the hole $c$ in the pillar A and prevents lateral play of the stud therein and it also enables the stud to be adjusted when necessary to insure a proper engagement of the head thereof with the wedge piece. The wedge D has a longitudinal slot $d$ therein and is provided with inclined or wedge faces $d'$ at opposite sides of the slot against which the head of the stud is adapted to bear. One end of the wedge is offset or projects at an angle to the wedge body and has an opening $d^2$ through which the head of the stud C is adapted to pass so as to allow the stud to enter into the slot $d$ with its head $c'$ engaging the inclined faces of the wedge. The offset end of the wedge bridges the slot $d$ and connects the inclined sides of the wedge and strengthens the same. The opening $d^2$ is large enough to permit the wedge to be slipped endwise over the headed stud. Preferably the wedge is stamped from sheet metal into the shape shown, the central slotted portion being raised to provide the inclined or wedge faces $d'$. When the wedge is to be used in a round tube the opposite side portions thereof which bear against the inner face of the tube are appropriately curved as shown at $d^3$, Fig. 5, but when the wedge is to be used in square or flat-faced tubes the side bearing portions are made flat, as shown at $d^4$, Fig. 8, so that the wedge will not dent or mar a thin-walled tube. E represents a retaining or locking device for the wedge, consisting of a thin metal strip having a bent middle portion $e$ which straddles the stud C in the slot $d$ of the wedge. One end of the retaining strip extends out through the opening $d^2$ of the wedge and bears with a spring tension against the offset end of the wedge, whereby the bent middle portion $e$ of the retaining strip is prevented from lifting off of the stud C, and the other end $e'$ of the strip extends through a guide opening $e^2$ at the opposite end of the wedge formed by slitting and depressing a portion $e^3$ of the wedge. Before the wedge is finally secured in place, this end $e'$ of the retaining strip extends straight out from the wedge as indicated by dotted lines in Figs. 2–4.

To secure the cross-tube and pillar together the headed stud C is inserted into the hole $c$ and the wedge D with the retaining strip E in place thereon is slipped over the stud and driven tightly in between the head of the stud and the wall of the tube or pillar with a suitable tool, thus drawing the cross-tube firmly up against the tube or pillar A. In driving the wedge into place, the engagement of the stud C in the bent portion $e$ of the retaining strip holds the retaining strip stationary while the wedge is moved longitudinally relative thereto and to the stud. When the wedge has been driven firmly into place the projecting end $e'$ of the retaining strip is bent over the adjacent end of the wedge to the position shown and thus positively holds the wedge in the position to which it is driven and prevents it from working loose or being displaced in shipping or handling the bed. The wedge device being positively held in place in this way insures a permanent tight connection of the cross-tube B with the tube or pillar A.

By making the wedge of sheet metal with the raised wedge faces $d'$ as explained, the head of the stud tends to flatten or depress these faces and contract the slot $d$ as the wedge is being driven into place, so that the edges of the raised portions are drawn together and grip the stud as indicated in Fig. 6, thereby further assisting in retaining the wedge in place.

In the modified construction shown in Figs. 9 and 10, the wedge D' is in the form of a tapering key which is driven through a slotted stud C' secured to the cross-tube B. The retaining strip E' passes through the slotted stud and has a bent portion $e^5$ embracing the stud to hold the retaining strip from movement with the wedge when driving the latter into place, and one end of the strip extends through a hole in the bent end $e^6$ of the wedge and is adapted to be bent around this end as shown in Fig. 10, to lock the wedge in place in the same manner as the retaining strip in the construction first described. The wedge has a hole $e^7$ adapted to receive the bent portion $e^5$ of the retaining strip so as to allow the end of the retaining strip to lie close to the wedge and thus permit the wedge and strip to be inserted into the slot of the stud C'. In driving the wedge into place the bent portion $e^5$ of the retaining strip rides out of the hole $e^7$, by reason of the inclination of the side $e^8$ of the bent portion.

The connecting devices described are simple and inexpensive in construction and can be readily placed in holding position in the tubes or pillars A, since it is only necessary to drive the wedge block into engagement with the stud and bend over the end of the retaining strip to hold the parts tightly together, after which the displacement of the wedge block is prevented by the retaining strip.

I claim as my invention:

1. The combination with two members to be secured together, one of which has a hole therein and the other of which has a stud which projects through said hole, of a wedge which is separate from said members and is adapted to be moved lengthwise between one side of said first member and a part of said stud for drawing said members firmly together, and a retaining device for preventing movement of said wedge relative to said stud, said retaining device being movably connected to said wedge and having a part which engages said stud to hold said retaining device from sliding with said wedge and having a portion adapted to be bent into holding engagement with said wedge, substantially as set forth.

2. The combination with two members to be secured together, one of which has a hole therein and the other of which has a headed stud which projects through said hole, of a wedge which is separate from said members and is adapted to be moved lengthwise between one side of said first member and the head of said stud for drawing said members firmly together, and a retaining device for said wedge having a slip connection with said wedge and having a part which engages said stud to hold said device from sliding with said wedge relative to said stud, said device being adapted to be placed in holding engagement with said wedge to prevent the releasing movement thereof, substantially as set forth.

3. The combination with two members to be secured together, one of which has a hole therein and the other of which has a headed stud which projects through said hole, of a wedge which is provided with a longitudinal slot and is adapted to be slipped endwise over said stud and forced between one side of said first member and the head of said stud for drawing said members firmly together, and a retaining strip carried by said wedge and engaging said stud and adapted to be bent to prevent movement of said wedge relative to said stud, substantially as set forth.

4. The combination with two members to be secured together, one of which has a hole therein and the other of which has a headed stud which projects through said hole, of a wedge which is provided with an open-ended longitudinal slot and is adapted to be slipped endwise over said stud and forced between one side of said first member and the head of said stud for drawing said members firmly together, said wedge having an offset bridge part connecting the sides of the wedge at the open end of said slot, and a retaining device for preventing movement of said wedge relative to said stud, substantially as set forth.

5. The combination with two members to be secured together, one of which has a hole therein and the other of which has a headed stud which projects through said hole, of a wedge which is provided with raised inclined portions adapted to straddle said stud and to be forced in between one side of said first member and the head of said stud for drawing said members firmly together, the edges of said inclined portions being adapted to yield under the pressure of the head of said stud whereby said edges are caused to grip said stud, substantially as set forth.

6. The combination with two members to be secured together, one of which has a hole therein and the other of which has a headed stud which projects through said hole, a slotted wedge through which said stud passes and which is adapted to be forced in between one side of said first member and the head of said stud for drawing said members firmly together, and a retaining device consisting of a strip having a bent portion which straddles said stud and is adapted to slide in the slot of said wedge, said strip having an end portion which extends through a hole in said wedge and is adapted to be bent over the end of the wedge to lock the wedge in place, substantially as set forth.

Witness my hand, this 12th day of July, 1912.

CHARLES VALLONE.

Witnesses:
FRANK ANDERSON,
G. C. MEISTER.